Sept. 29, 1959     H. M. HAIDEGGER     2,906,028
INSTRUMENT FOR LINEAR MEASUREMENT AND/OR
TOLERANCE TESTING OF WORKPIECES
Filed June 5, 1956     2 Sheets-Sheet 1
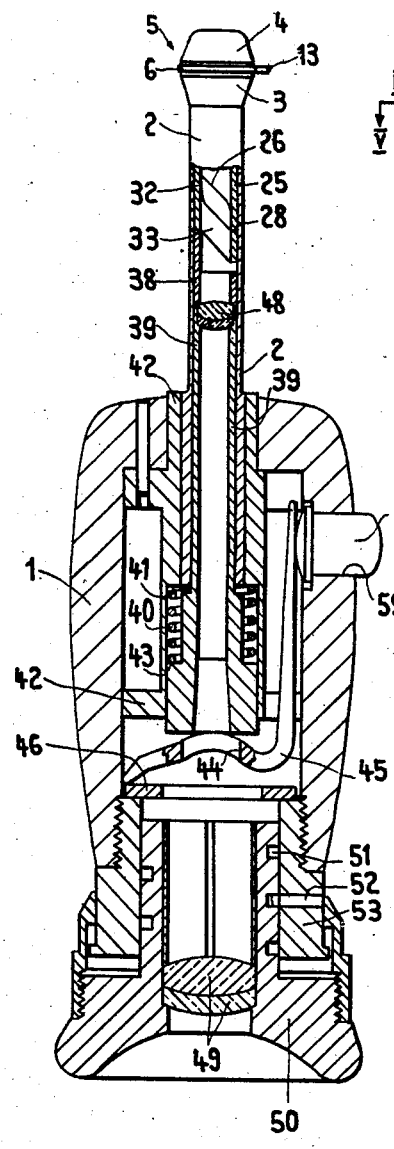
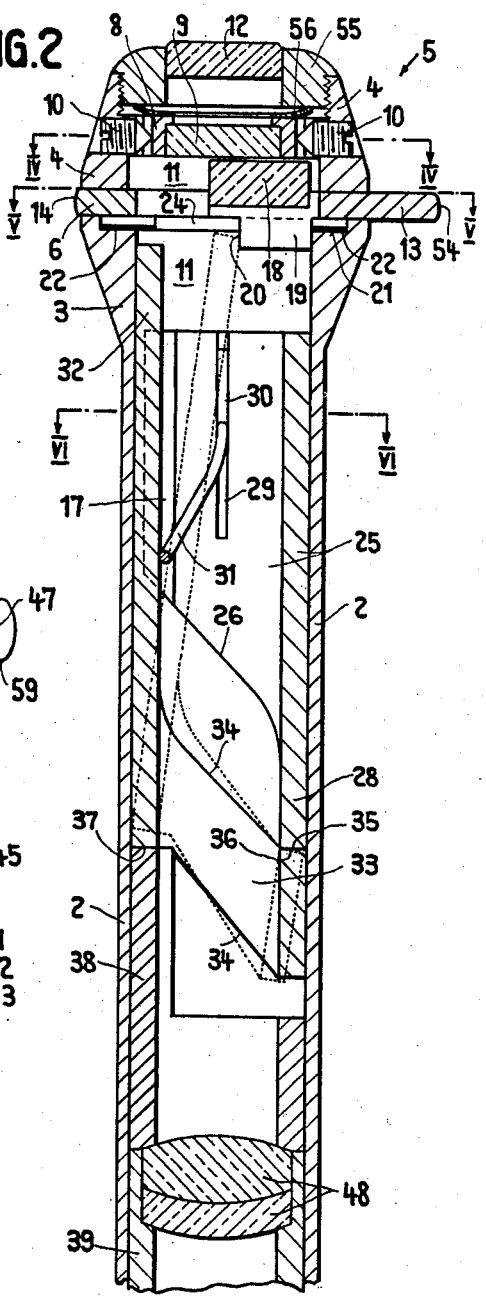
INVENTOR
Hans Haidegger
BY
ATTORNEY

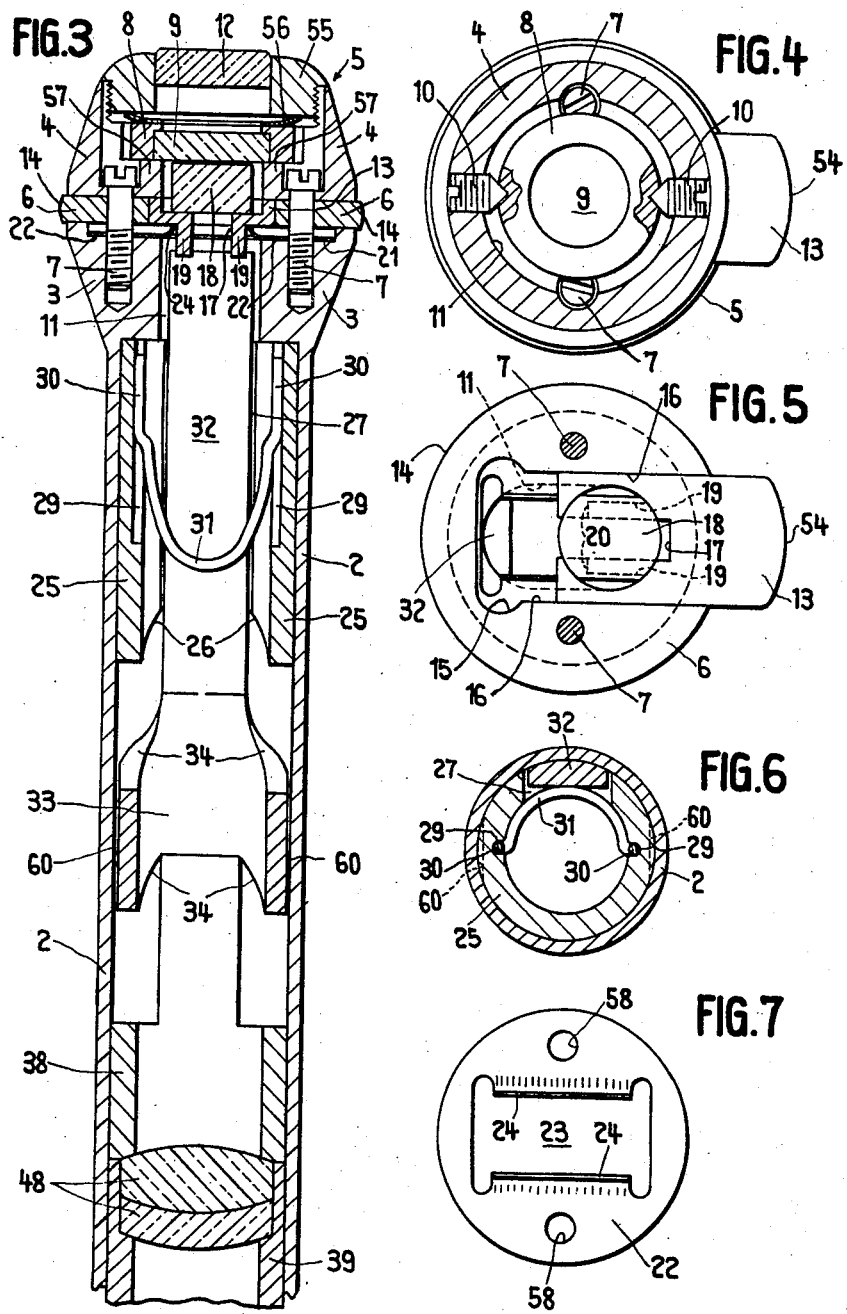

United States Patent Office 2,906,028
Patented Sept. 29, 1959

2,906,028
INSTRUMENT FOR LINEAR MEASUREMENT AND/OR TOLERANCE TESTING OF WORKPIECES

Hans Max Haidegger, Solothurn, Switzerland, assignor to Ebauches S.A., Neuchatel, Switzerland Application June 5, 1956, Serial No. 589,501

Claims priority, application Switzerland September 26, 1955

9 Claims. (Cl. 33—143)

An object of the invention is to provide an instrument for linear measurement and/or tolerance testing of workpieces.

Another object of the invention is to provide an instrument of the above kind with a feeler member shiftable in a measuring head or the like and fixable by a braking device.

In prior instruments of this kind a spring is provided in the feeler member formed as a hollow pin, this spring tending to move the pin axially towards the surface to be contacted of the workpiece. The feeler member is held in measuring or testing position against the constraint of the spring by means of a brake wedge going through slots of the feeler member. When the feeler member is to be displaced by the effect of its spring, the spring-loaded brake wedge must be released.

It is a further object of the invention to provide a braking spring continuously acting on the feeler member for fixing the feeler member in any desired position. Therefore, there is no longer a spring driving the feeler member, but only a spring continuously exerting a braking action on the feeler member. The feeler member may for instance be displaced by hand or by means of a lever, i.e. by a force necessary to overcome the effect of the braking spring. Due to the omission of a brake wedge the instrument can for instance be used as an inside measuring and/or tolerance testing means for borehole diameters, such as for instance for measuring ranges with 6 mm. as smallest diameter.

Other objects and features will be apparent as the following description proceeds, reference being had to the accompanying drawings.

The accompanying drawings illustrate by way of example an embodiment of the invention. This example is an inside measuring and/or tolerance testing instrument with a handle-like casing and with a reading device readable in longitudinal direction of the casing through a through-hole of the measuring head, through the casing, and through an opening of the feeler member. In the drawings—

Fig. 1 is a longitudinal section through the entire instrument,

Fig. 2 is a longitudinal section, on a larger scale, through the measuring head and through the tubular portion of the casing.

Fig. 3 is a longitudinal section in a plane at right angles to the plane of section of Fig. 2, seen from the right in Fig. 2.

Fig. 4 is a section along line IV—IV of Fig. 2, and

Figs. 5 and 6 are sections along lines V—V and VI—VI respectively of Fig. 2.

Fig. 7 is a top view of the disk-shaped braking spring for the feeler member.

Referring to Fig. 1, the casing of the instrument has a hollow handle 1 and a tubular piece 2 coaxially fixed to the handle 1 by means of a sleeve 42. The outer end of the tubular casing portion 2 carries the measuring head 5 comprising the head pieces 3 and 4. The head piece 4 is fixed to the head piece 3 by means of bolts 7, a guide member 6 (described later-on) being inserted between the pieces 3 and 4. The head piece 4 carries a graticule 9 held in a setting 8 and provided with a nonius (not shown) or a reading mark or other marks. The position of the graticule 9 is adjustable in a direction across the longitudinal axis of the instrument by means of two adjusting screws 10 and is pressed against ribs 57 of the piece 4 by means of an annular spring 56 supported on the external screw part 55. The measuring head 5 has a through-hole 11 coaxial to the bore of the tubular piece 2, the outer end of through-hole 11 comprising a transparent cover 12 set in the screw part 55. The guide member 6 guides the adjustable feeler member 13 in a direction perpendicular to the axis of the opening 11 and to the longitudinal axis of the tubular piece 2 of the casing. Referring to Fig. 5, the guide member 6 is in the shape of a disc and has a spherically rounded edge 14 and an aperture 15 open towards the right in Fig. 5. The aperture 15 gives free sight through the entire instrument in longitudinal direction and the edges 16 of the aperture 15 serve as a slide guide to the plate-like feeler member 13. The plate-like feeler member 13 has an aperture 17 giving free sight through the entire instrument in the axial direction of the latter. Above the aperture 17 a well-known transparent graticule 18 with a scale is fixed, for instance cemented to the feeler member 13. The scale of the graticule 18 lying in the opening 11 and the nonius or reading mark or other marks of the graticule 9 lying likewise in the opening 11 cooperate together for determining a measured dimension and/or for the tolerance testing of a work piece. The feeler member 13 has extensions 19 directed towards the tubular piece 2, the end faces 20 of these extensions forming stop surfaces cooperating with a lever in a manner described later on. At the side of the guide member 6 and of the feeler member 13 turned towards the tube 2, a disk-shaped or generally plate-shaped braking spring 22 is supported on a shoulder 21 of the head piece 3, the bolts 7 going through holes 58 of the spring 22. Referring to Fig. 7, the braking spring 22 has an aperture 23 giving free sight through the instrument in the axial direction of the latter. The longitudinal rims of the aperture 23 are bent upward and form springy lugs 24 bearing elastically against the plate-like feeler member 13 and pressing the latter against the underside of the head piece 4. In this way, the lugs 24 exert a braking effect onto the feeler member 13 to hold the latter in any position desired along the guide edges 16 in such a way that the feeler member cannot move by itself, but can be adjusted along the guide edges 16 against the braking effect of the spring 22 either by hand or by means of a lever described later on.

In the tubular casing piece 2 connecting the measuring head 5 with the handle 1 a supporting tube 25 with a longitudinal slot 27 extending through the whole length of the tube 25 is provided, this tube bearing springily against the inner wall of the tubular piece 2. At the end turned towards the handle 1, the tube 25 is cut away along an inclined plane 26 and comprises at this end only an extending lug 28 lying at the side opposite to the slot 27. The inside wall of the supporting tube 25 has two grooves 29 displaced at right angles with regard to the slot 27. These grooves receive the ends 30 of a stirrup-shaped spring 31 leaving free sight through the casing. For adjusting the correct position of the spring 31 on assembling the instrument, the ends 30 can be shifted in the grooves 29. Referring to Figs. 2, 3 and 6, the stirrup-shaped spring 31 bears against a lever arm 32 going through the slot 27 of the supporting tube 25 and, under the influence of the spring 31, bearing against the inside wall of the tubular piece 2 when in the position shown in full lines in Fig. 2. In this position the lever arm 32 leaves free sight through the hollow casing. The lever arm 32 extends far enough to allow its free end to strike against the stop surfaces 20 of the extensions 19 of the feeler member 13. The lever arm 32 is integral with or fixed to a tubular section 33 allowing free sight through the instrument. The end faces 34 of the section 33 lie in planes at acute angles to the axis of the tubular piece 2. In the position of the lever 32, 33 as shown in full lines in Fig. 2 the surface 35 of the tube section 33 bears against the end face 36 of the extending lug 28 of the supporting tube 25 and the surface 37 of the tubular section 33 bears against an extending lug of an intermediate tube 38 axially adjustable in the tubular piece 2. The intermediate tube 38 is followed by a sliding tube 39 axially adjustable within the tubular piece 2 and extending beyond the piece 2 into the hollow handle 1 of the casing. A compression spring 40 is supported on a shoulder 41 of the sleeve 42 fixed to the handle 1 and on a shoulder 43 of the sliding tube 39 and presses the latter against a pusher lever 45 having a central opening 44 leaving free sight through the instrument. The one end of the pusher lever 45 is supported on a disc 46 of the casing and the other end on a push button 47 accessible from the outside and shiftably mounted in a bore 59 of the handle 1. Near its outer end the sliding tube 39 carries a lens 48 belonging to the optical system of the reading device. The lens 48 is at a large distance from the lens 49 of the eyepiece 50 and gives, together with the lens 49, a magnification, without parallax, of the graticules 9 and 18. This magnification may, for instance, be fifty-fold. The eyepiece 50 has a thread-groove 51 engaged by a pin 52 of a socket 53 screwed to the handle 1.

Let us assume that the diameter of the bore of a workpiece is to be measured and/or the tolerance of this bore to be tested, and the instrument parts are in the position shown in the drawings. At first, the feeler member 13 laterally projecting from the measuring head 5 is pushed by hand against the braking effect of the braking spring 22 towards the left (Figs. 1 and 2) into the measuring head 5. Afterwards, the measuring head 5 of the instrument with the handle taken hold of is inserted into the bore hole while holding the axis of the handle 1 inclined with regard to the axis of the bore hole to be tested. Then the button 47 is pushed inwards whereby the lever 45 is swung in the anticlockwise direction (Fig. 1) and the sliding tube 39 is shifted towards the measuring head 5 against compression of the spring 40. The displacement of the tube 39 is transmitted to the intermediate tube 38 and the end face of the latter presses onto the surface 37 of the lever 32, 33, so that the latter is swung against the constraint of the spring 31 in the clockwise direction (Fig. 2) around the end face 36 of the extending lug 28 of the supporting tube 25 into the dotted position (Fig. 2) and enters the sight reach of the instrument. In order to enable a sufficient swing angle of the tubular section 33 in the tubular piece 2, the section 33 is provided with flattenings 60 (Fig. 3). Under certain circumstances, the clearance of the sliding seat between the parts 2 and 33 may be sufficient for adequately swinging the lever 32, 33. On swinging the lever 32, 33 the free end of the lever arm 32 strikes against the stopping surfaces 20 of the feeler member 13 and moves the latter against the constraint of the braking spring 22 towards the outside (towards the right in Fig. 2) until its curved surface 54 strikes against the borehole wall. At this moment, the push button 47 is let go. Now, the compressed spring 40 can shift the sliding tube 39 towards the inside and thereby the tube 39 moves the lever 45 with the push button 47 back into the position of Fig. 1. The retraction of the tube 39 enables the spring 31 to swing the lever 32, 33 out of the dotted position, i.e. out of the sight reach of the instrument back to the full line position (Fig. 2), whereby the surface 37 of the tube section 33 also pushes the intermediate tube 38 back into the position of Fig. 2. After having let go the push button 47 and after the above described backward movement of the various parts being completed, the instrument is swung until the median plane of the platelike feeler member 13 comes in a cross sectional area of the borehole to be measured and/or tested. On this swinging movement, the feeler member 13 is automatically pushed inwards against the constraint of the braking spring 22 and, under the braking action of the spring 22, remains in the innermost position into which it has been displaced. Now the measuring head 5 is taken out of the borehole and the eyepiece 50 is brought in front of the eye while looking through the instrument in the direction of the transparent cover 12, while adapting the distance between the lenses 48 and 49 to the eye by turning the eye-piece 50. Now, the dimension desired can be read and/or it may be checked whether the dimension is within the required allowance or not.

The shown and described embodiment is an inside measuring and/or tolerance testing instrument. The instrument according to the invention may, however, also be a micrometer or a gap gage for measuring or testing outside dimensions. If the instrument is made shorter than in the example shown and described, while choosing the optical system of the reading device accordingly, the push button 47 may be arranged to act directly on the lever arm 32 so that at a simultaneous adequate adaptation of the swinging mounting of the lever 32, 33, the intermediate tube 38, the sliding tube 39 and the lever 45 can be omitted. There may also be an embodiment within the scope of the invention, where for instance, in a micrometer or in a gap gage, also the lever 32, 33 may be omitted, in that, for applying the feeler member 13 to the wall of the workpiece, the feeler member can be shifted by hand in the measuring head.

While I have shown and described some performance of my invention, I do not wish to limit the scope of my Letters Patent to this performance but reserve the right of making such modifications as fall within the purview of the appending claims.

What I claim is:

1. In an instrument for linear measurement and tolerance testing of work pieces, a head provided with a sight passage providing free sight therethrough said head having an opening intersecting said sight passage, a stationary feeler surface on said head opposite the opening, a feeler member arranged slidably in said opening and projecting therefrom and shaped to permit free sight through said sight passage, and a spring engaging said feeler member to permanently brake said feeler member and intersecting said sight passage and having an aperture in alignment with said sight passage permitting free sight therethrough.

2. In an instrument for linear measurement and tolerance testing of work pieces, a head provided with a sight passage permitting free sight through said head and an opening intersecting said sight passage, a stationary feeler surface on said head located opposite the opening, a platelike feeler member arranged slidably in said opening and projecting therefrom and provided with an aperture to permit free sight through said sight passage, and a brake spring engaging said platelike feeler member to permanently brake said feeler member and intersecting said sight passage and having an aperture in alignment with said sight passage to leave free sight therethrough.

3. In an instrument for linear measurement and tolerance testing of work pieces, a head provided with a sight passage permitting free sight through said head and an opening at one end intersecting said sight passage, a stationary feeler surface on said head located opposite the opening, a platelike feeler member arranged slidably in said opening to project at its front end therethrough and provided with an aperture to permit free sight through said sight passage, and a brake spring intersecting said sight passage and having an aperture permitting free sight through said sight passage, a rim of the aperture of said brake spring being bent towards said feeler member to form a springy lug bearing elastically and permanently against the adjacent surface of said platelike feeler member.

4. In an instrument for linear measurement and tolerance testing of work pieces, a head including two head pieces screwed together, said head being provided with a sight passage to permit free sight through said head, a guide member inserted between said head pieces and provided with an opening intersecting said sight passage, a stationary feeler surface on said guide member located opposite the opening, a platelike feeler member arranged slidably in said opening to project at its front end therethrough and provided with an aperture to permit free sight through said sight passage, a disc inserted between one of said head pieces and said guide member, said disc having an aperture in reach of said sight passage to leave free sight therethrough, opposite rims of the aperture of said disc being bent towards said guide member to form springy lugs bearing elastically and permanently against the adjacent surface of said platelike feeler member.

5. In an instrument for linear measurement and tolerance testing of work pieces, a handle-shaped casing having a sight passage therethrough, a head fixed to said casing and having an opening therein, reading means said reading means readable through said sight passage in the longitudinal direction of said casing, said head opening intersecting said sight passage, a stationary feeler surface on said head opposite the opening, a feeler member arranged slidably in said opening to project at its front end through the opening and shaped to permit free sight through said sight passage, a plate-shaped brake spring engaging said feeler member to permanently brake said feeler member and arranged to permit free sight through said sight passage, a lever swingingly mounted in said casing and operable to engage said feeler member for displacing said feeler member against the constraint of said brake spring, and a return spring mounted in said casing and shaped to permit free sight through said sight passage and engaging said lever to return said lever to a position in which it does not disturb the sight through said sight passage.

6. In an instrument according to claim 5, said return-spring being stirrup-shaped.

7. In an instrument according to claim 5, said feeler member being platelike and having a stop extending into the path of said lever.

8. In an instrument according to claim 5, a supporting tube within and coaxial to said casing, said lever comprising a tiltable tubular section within said casing, supported by said supporting tube, the faces of said tubular section lying in planes at an acute angle to the axis of said casing, a spring-loaded sliding tube provided in and coaxial to said casing at the end of said tubular section away from said supporting tube, and an actuating lever located within said casing in a manner to leave free sight through said casing and accessible from the outside, said actuating lever engaging said sliding tube.

9. In an instrument according to claim 8, said return-spring being held by said supporting tube.

References Cited in the file of this patent

UNITED STATES PATENTS

| | | |
|---|---|---|
| 636,098 | Arnot | Oct. 31, 1899 |
| 2,363,165 | Vierling | Nov. 21, 1944 |
| 2,553,086 | Haidegger | May 15, 1951 |
| 2,581,473 | Eisele | Jan. 8, 1952 |

FOREIGN PATENTS

| | | |
|---|---|---|
| 463,361 | Great Britain | Mar. 30, 1937 |